(12) United States Patent
Finke-Anlauff et al.

(10) Patent No.: US 8,531,402 B2
(45) Date of Patent: Sep. 10, 2013

(54) ELECTRONIC DEVICE WITH SEPARATE COVER HAVING USER INTERFACE

(75) Inventors: Andrea Finke-Anlauff, Braunschweig (DE); Torsten Gunther, Braunschweig (DE); Lutz Cordes, Hannover (DE)

(73) Assignee: Nokia Corporation, Espoo (FI)

( * ) Notice: Subject to any disclaimer, the term of this patent is extended or adjusted under 35 U.S.C. 154(b) by 513 days.

(21) Appl. No.: 11/119,152

(22) Filed: Apr. 29, 2005

(65) Prior Publication Data

US 2006/0244728 A1 Nov. 2, 2006

(51) Int. Cl.
*G06F 3/02* (2006.01)

(52) U.S. Cl.
USPC .... 345/168; 340/407.2; 455/90.3; 455/556.2; 361/679.06; 361/679.08; 361/679.11

(58) Field of Classification Search
USPC .............. 361/683, 686, 680, 679.06–679.3; 345/168–173; 455/566, 557, 575.3; 456/556.2
See application file for complete search history.

(56) References Cited

U.S. PATENT DOCUMENTS

| | | | |
|---|---|---|---|
| 5,241,303 A * | 8/1993 | Register et al. | 345/168 |
| 5,268,817 A * | 12/1993 | Miyagawa et al. | 361/679.07 |
| 5,768,163 A | 6/1998 | Smith, II | |
| 6,025,986 A * | 2/2000 | Sternglass et al. | 361/679.08 |
| 6,108,200 A * | 8/2000 | Fullerton | 361/679.12 |
| 6,223,233 B1 | 4/2001 | Kavanaugh et al. | |
| 6,421,235 B2 * | 7/2002 | Ditzik | 361/679.3 |
| 6,690,353 B2 * | 2/2004 | Chang | 345/156 |
| 6,747,635 B2 * | 6/2004 | Ossia | 345/169 |
| 6,803,904 B2 * | 10/2004 | Furuki et al. | 345/168 |
| 6,850,226 B2 | 2/2005 | Finke-Anlauff | 345/169 |
| 6,894,626 B2 * | 5/2005 | Olodort et al. | 341/22 |
| 6,961,004 B2 * | 11/2005 | Kumar | 340/11.1 |
| 6,972,699 B2 * | 12/2005 | Olodort et al. | 341/22 |
| 7,052,296 B2 * | 5/2006 | Yang et al. | 439/165 |
| 7,102,614 B2 * | 9/2006 | Sandbach et al. | 345/156 |
| 7,126,588 B2 * | 10/2006 | Oakley | 345/169 |
| 7,142,194 B1 * | 11/2006 | Northway | 345/168 |
| 7,149,557 B2 * | 12/2006 | Chadha | 455/575.1 |
| 7,269,000 B2 * | 9/2007 | Webb et al. | 361/679.27 |
| 7,454,000 B1 * | 11/2008 | Henderson | 379/142.04 |
| 7,577,462 B2 * | 8/2009 | Kumar | 455/557 |
| 2002/0091877 A1 * | 7/2002 | Karidis | 710/1 |

(Continued)

FOREIGN PATENT DOCUMENTS

| | | |
|---|---|---|
| JP | 2002055761 A | 2/2002 |
| KR | 20030071220 A | 9/2003 |
| TW | 578968 U | 3/2004 |

OTHER PUBLICATIONS

Korean Office Action dated Sep. 9, 2009.

(Continued)

*Primary Examiner* — Quan-Zhen Wang
*Assistant Examiner* — Vinh Lam
(74) *Attorney, Agent, or Firm* — Harrington & Smith

(57) ABSTRACT

A multi-function electronic device is constructed in two parts. A communication part is a self sufficient device for providing multiple functions, such as, cellular phone, PDA, camera, and others. A cover part has a receptacle for receiving the communication part. The cover part includes a lid that is movable from an open position to a position extending over the receptacle. A keyboard is constructed in the lid for use when the lid is in the open position and the communication part is in the cover part.

24 Claims, 3 Drawing Sheets

(56) References Cited

U.S. PATENT DOCUMENTS

| | | |
|---|---|---|
| 2002/0101705 A1 | 8/2002 | Genest et al. |
| 2002/0163778 A1* | 11/2002 | Hazzard et al. ............... 361/683 |
| 2003/0006968 A1 | 1/2003 | Solomon |
| 2003/0100338 A1* | 5/2003 | Lee ............................... 455/556 |
| 2003/0206394 A1* | 11/2003 | Ossia ............................ 361/680 |
| 2004/0023696 A1 | 2/2004 | Kim |
| 2004/0114319 A1* | 6/2004 | Hill et al. ..................... 361/683 |
| 2005/0057894 A1* | 3/2005 | Kim et al. ..................... 361/683 |
| 2005/0243504 A1* | 11/2005 | Wong et al. ................... 361/683 |
| 2006/0105722 A1* | 5/2006 | Kumar .......................... 455/90.3 |
| 2008/0174943 A1* | 7/2008 | Hirasawa et al. ............. 361/681 |
| 2008/0273297 A1* | 11/2008 | Kumar .......................... 361/680 |

OTHER PUBLICATIONS

Taiwanese Search Report dated Jul. 15, 2011.

* cited by examiner

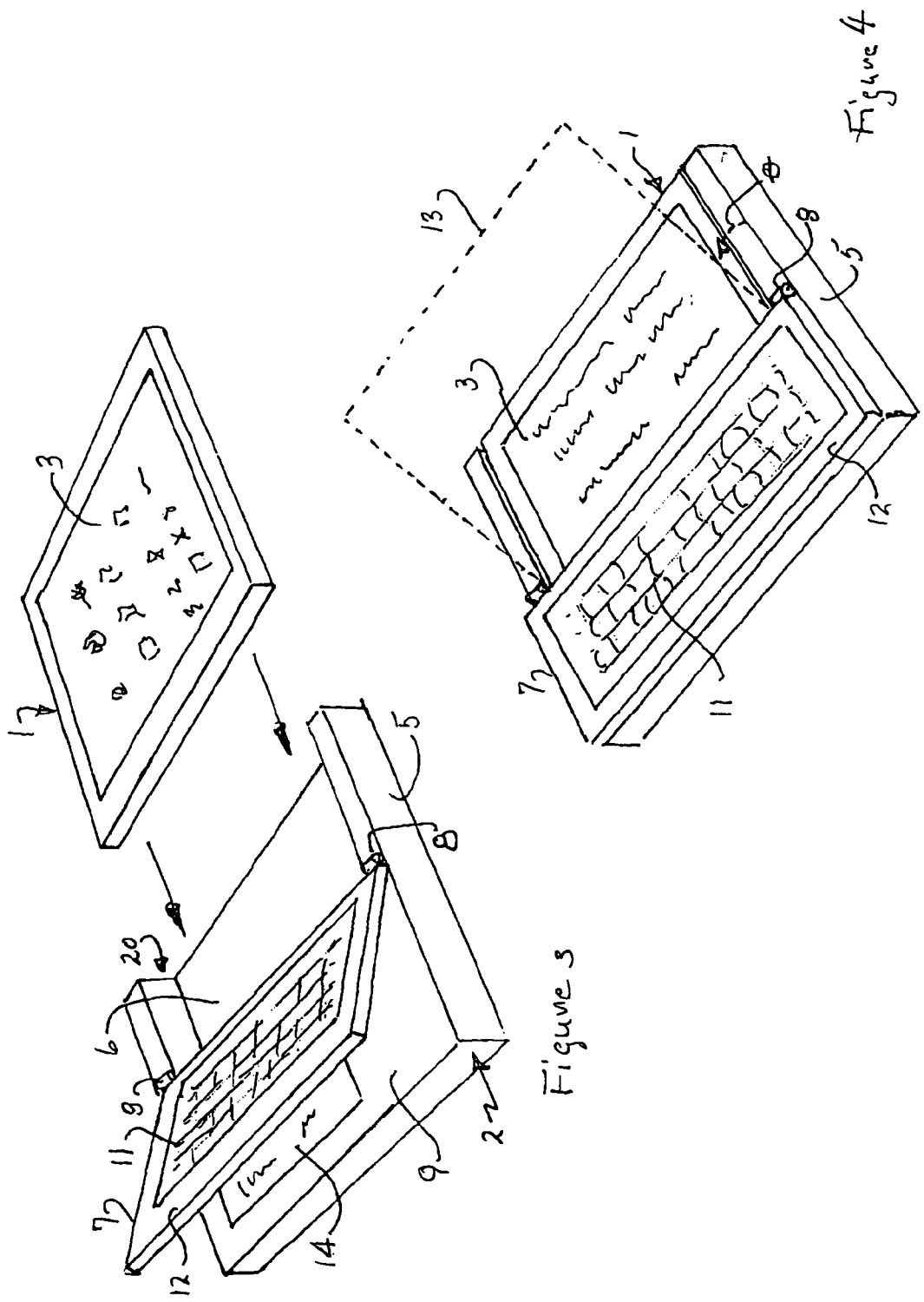

ELECTRONIC DEVICE WITH SEPARATE COVER HAVING USER INTERFACE

BACKGROUND OF THE INVENTION

1. Field of the Invention

The subject matter of this application relates to a multi-use electronic device. More specifically, this application describes a unique arrangement of a two part electronic device that utilizes a touch screen display and separate cover having a full text keyboard.

2. Brief Description of Related Developments

Mobile telephones and similar communication devices are rapidly expanding in use and function. Such devices will soon accommodate many diverse services such as, Internet access, personal information management, facsimile, imaging, messaging, and video conferencing, in addition to telephone communication. To accomplish this there is a need to provide keypads, function buttons, and displays that are compatible with the more complex applications to which the mobile device will be adapted. Full function text keyboards, such as the standard QWERTY typing array of keys and buttons, are difficult to provide while maintaining the compact size required in the mobile device. An equally difficult problem is presented by the need for display screens that can display the vast amount of different information that will be accessible by these devices. Such devices on the market today are cumbersome and often require several devices to obtain the full array of functions, i.e. personal digital assistant and a mobile telephone.

With the introduction of such multi-function electronic devices, it has become increasingly more difficult to design a user interface that enables the user to access the many types of functions and applications available in small hand held devices. It is a particular challenge to present a simple and efficient means by which the user can communicate with the device for browsing, selecting, and operating amidst the wide array of functional choices. The user interface generally consists of a keypad for entering data and commands and a display screen for presenting information relating to operation of the selected function. The keypad and display are in continuous competition for space on the device, as it is desirable that each be as large as possible for ease of use and viewing. This is particularly difficult when it is advantageous to provide a full function keyboard, for example, a QWERTY style keyboard.

It is a purpose of this invention to provide a keyboard mounted on a cover part to maximize the allotment of space to both the display and the keyboard.

It is a purpose of this invention to provide a simple and inexpensive full function mobile communications device which can access many services through the use of a single device. It is another purpose of this invention to combine the personal digital assistant with a mobile telephone in a practical package of minimum dimensions. It is also a purpose of this invention to provide a configuration of text keyboard and display that maximizes the size of both.

SUMMARY OF THE INVENTION

A multi-function electronic device is provided with a communication part which is adapted for independent operation as a cellular phone, personal digital assistant (PDA), and other modes, such as digital camera. A touch sensitive display provides the user interface enabling the communication part to operate on an independent basis. The communication part encloses the operational components to enable the functions provided. A cover part is constructed with a receptacle into which the communication part may be inserted. A flip up panel is pivotally mounted on the cover part to provide visual and physical access to the communication part once it is within the cover part.

In order to enhance the text input capability of the PDA function of the communication part a full text keyboard is constructed on the inside surface of the flip up panel so that it is useable for text input when open. When inserted into the cover the communication device is operatively connected to the keyboard.

In accordance with one aspect of the invention, the keyboard is pivotally mounted on the cover in a manner that allows it to be opened approximately 180° into an operational position to rest on an adjacent portion of the cover in a secure and supported position.

In accordance with another aspect of the invention, when the keyboard is in its operational position the touch screen display is visible and operates in conjunction with the full text keyboard to display text in parallel with the longitudinal axis of the keyboard. In another aspect of the invention, in this position, the display is constructed to pivot upward to provide an ergonomically convenient orientation with the keyboard.

In accordance with another aspect of the invention, the communication device may be inserted into the cover and the keyboard closed to protect the touch screen display. Windows are constructed in the cover in strategic locations to allow viewing of images and data for use in a communication or camera function.

BRIEF DESCRIPTION OF THE DRAWINGS

The multi-function device of this invention is explained in more detail below with reference to the accompanying drawings, in which:

FIG. 3 is a perspective view of the communication portion and cover portions separated;

FIG. 4 is perspective view of the communication portion engaged in the cover portion.

BRIEF DESCRIPTION OF THE PREFERRED EMBODIMENTS

Figure 2:
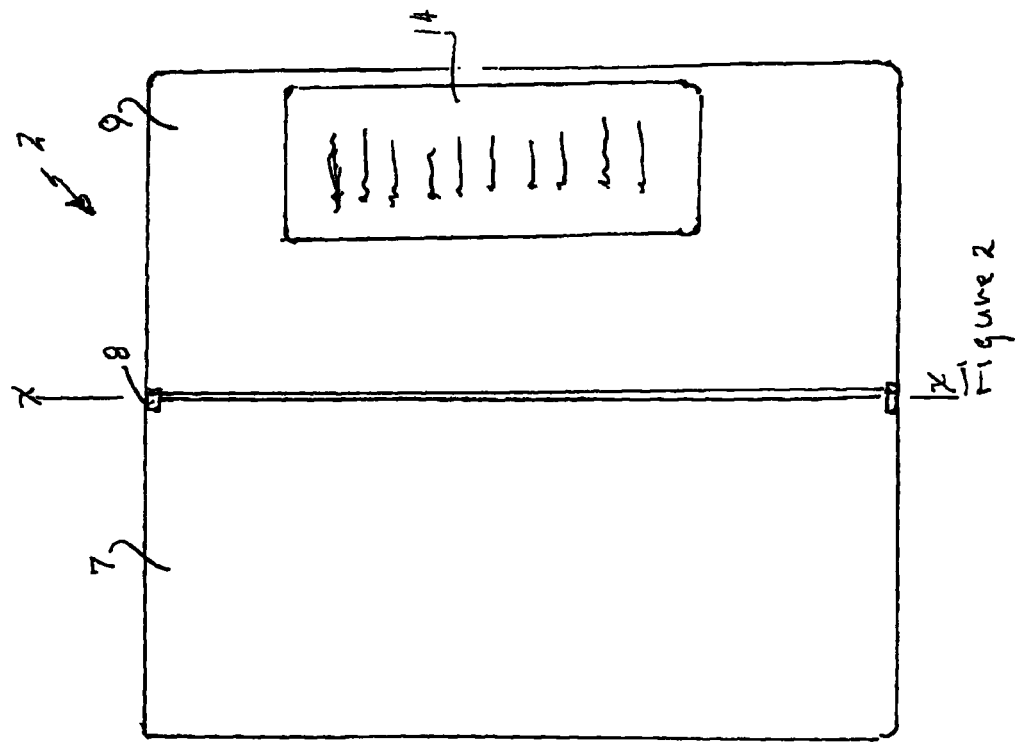
FIG. 2 is a plan view of the cover portion of the multi-functional device of this invention.

A multi-functional electronic device 10, for example, a combination PDA/cellular telephone incorporating the features of the present invention is illustrated in the figures. Although the present invention will be described with reference to the embodiments shown in the drawings, it should be understood that the present invention may have many alternate forms. In addition, any suitable size, shape or type of elements or materials could be used.

Figure 1:
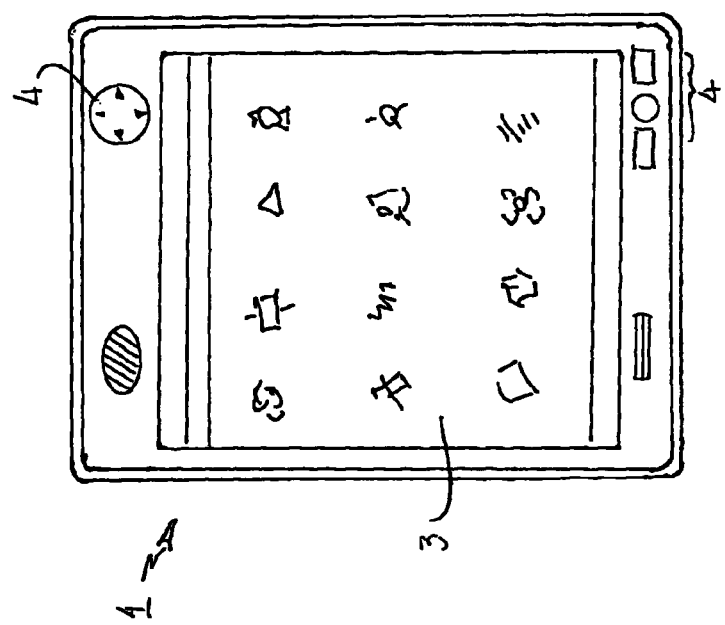
FIG. 1 is a plan view of the front of the communication portion of the multi-functional device of this invention.

The multi-functional device 10 of this invention is constructed in two parts, an independently operable communications part 1 and a cover part 2, as shown in FIGS. 1 and 2. Communications part 1 encloses the components of the device in various known configurations to provide a wide variety of functions and applications. These components include, for example a microprocessor, mobile telephone transceiver, PDA, display driver firmware, memory and other processor components depending on the features offered to the user. In the preferred embodiment these features include a mobile telephone, a PDA, and a camera. The communications part 1 is constructed with a touch screen display 3 and interface keys and buttons 4 for operation of the camera feature, power on/off, and other basic functions. The touch sensitive screen 3 may be configured to provide the user interface for the PDA and telephone features.

The cover part 2 is constructed with a base 5 having a receptacle 6 for receiving the communications part 1. As shown in FIG. 3, cover part 2 has a flip up lid 7 pivotally connected to the base by hinges 8, adjacent to the receptacle 6. The lid 7 is moveable between a position in which the lid extends at least partially over the receptacle and an open position in which the lid 7 rests on a flat deck 9 at the rear of the cover 2. The receptacle 6 includes an opening 20 that allows insertion of communication part 1 independent of the position of the lid 7. A full text keyboard 11 is mounted on the inside face 12 of lid 7 relative to the cover position. The keyboard 11 is accessible in the fully opened position of the lid 7 and is securely supported by deck 9.

Since the operational components of the multi-function device 10 are contained in the communications part 1, an electrical connection is provided when the communication part 1 is engaged in cover part 2. This enables the keyboard 11 to be fully operationally in conjunction with touch screen display 3.

In an alternate embodiment, communication part 2 is engagable in the cover position in two operational positions, one, a fully inserted position, as shown in FIG. 4, or a pivoted position, as shown in phantom in FIG. 4. In the fully inserted position, the display screen 3 may not be fully visible and the display portion is therefore limited to a certain extent. In the pivoted position (see phantom lines 13), the touch screen display may be tilted upward to provide an ergonomic orientation, for example at angle θ of 100° to 170°. In this position, the display 3 is fully exposed and can be configured to provide a full display for keyboard 11. In this manner the space allotment for the keyboard and display in a multi-functional device is maximized within the limits of the device without compromising the functioning of either component.

In an alternate embodiment of this invention, window 14 may be constructed in rear deck 9 to provide visible access to a portion of display screen 3. The display 3 may be configured to provide a display interface for a camera or cellular phone feature, thereby enabling these features to be used without removing part 1 from the cover part 2.

Figure 5:
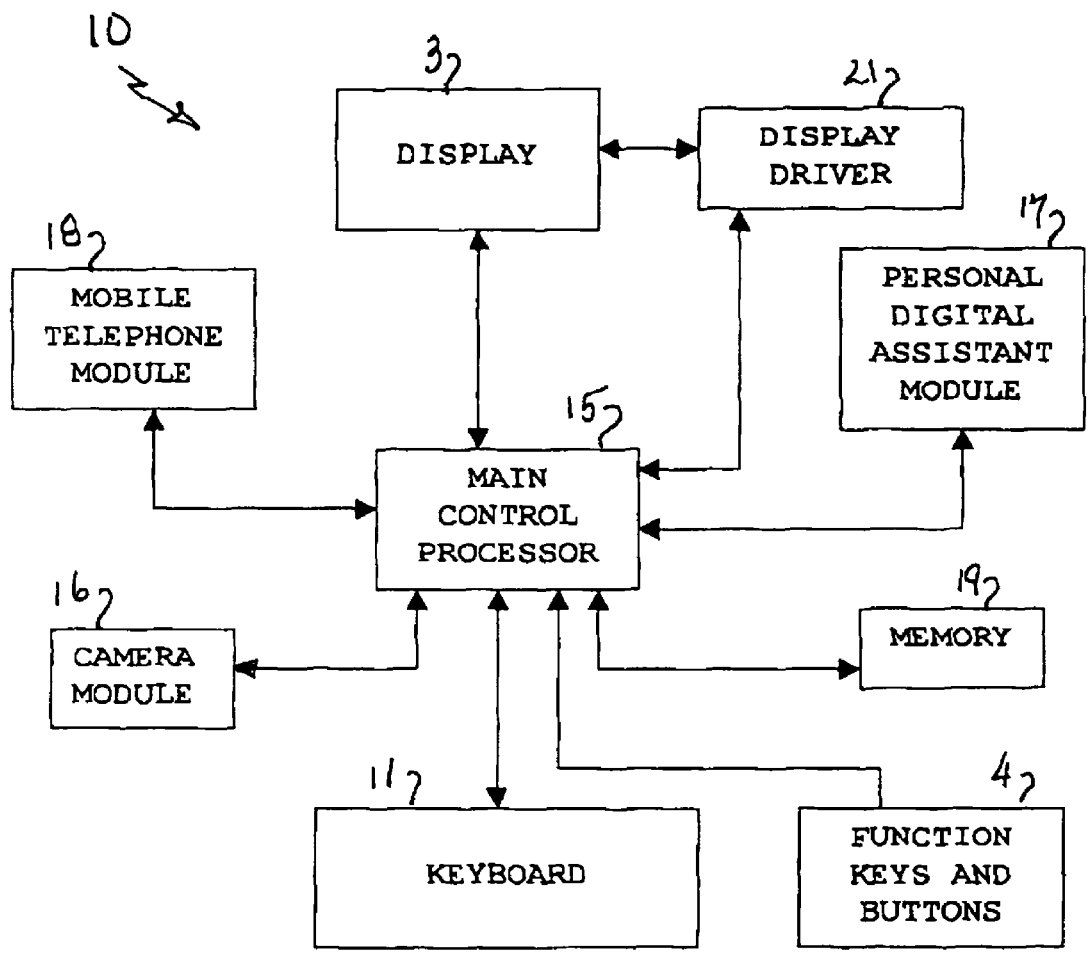
FIG. 5 is a block diagram of the components of a multi-functional device according to the invention.

In operation, as shown in FIG. 5, the multifunction communication terminal 10 of FIGS. 1-4, comprises a system of components that are operatively interconnected through main controller 15 to provide the combined functions of a camera 16, PDA 17, and mobile telephone 18. Main control processor 15 is supported by a memory 19 and processes data and commands from mobile telephone module 18, camera module 16, and PDA module 17, and other user interface components. The primary user interface of the device 10 includes touch sensitive display 3 and function keys and buttons 4. The display 3 has an associated driver 21. Touch sensitive display screen 3 is operable to support data input for PDA functions, for example in association with keyboard 11, and a data or image display mode to support other functions. Browser key and soft keys 4 provide a secondary user interface as needed. Controller 15 provides the operating function of the PDA 17 and coordinates the operation of the keyboard 11 with the display screen 3.

Display driver 21 is operatively associated with display screen 3 to cause the displayed data to be oriented longitudinally on the display screen 3, in parallel with the keyboard 11. Insertion of communication part 1 in cover part 2 prompts controller 15 to activate the keyboard 11 and cause display driver 21 to orient the displayed data accordingly. The size of the display area would also be coordinated according to the available space for the different engagement positions, i.e. full insertion, or pivotal, of communication part 1 in the cover part 2. In addition, the display area would be configured to conform with the area of display 3 exposed by window 14, when the communication part 1 is fully inserted and the lid 7 is closed.

It should be understood that the above description is only illustrative of the invention. Various alternatives and modifications can be devised by those skilled in the art with out departing from the invention. Accordingly, the present invention is intended to embrace all such alternatives, modifications and variances which fall with the scope of the appended claims.

What is claimed is:

1. An apparatus comprising:
    an enclosure with an opening configured to receive a part having a display screen;
    a deck constructed adjacent to the opening;
    a lid pivotally connected to the deck, wherein the lid is configured to move between:
        an open position in which a surface of the lid underneath and opposite a keyboard mounted on the lid is supported by and in direct contact with a supporting planar surface of the deck and the lid does not close the opening, and
        a closed position in which the lid closes the opening and the surface of the lid underneath and opposite the keyboard mounted on the lid is not supported by and not in direct contact with the supporting planar surface of the deck;
    the keyboard mounted on the lid and accessible for use in the open position; and
    a connector within the enclosure configured to connect the keyboard to the part having the display screen when the part having the display screen is positioned in the enclosure, wherein the keyboard, when connected to the part having the display, is in operative association with the display screen, to allow a keyboard input to control the display of data and images on the display screen,
    wherein the supporting surface of the deck projects in substantially a same direction as a direction in which the display screen projects, when the part having the display screen is positioned in the enclosure and in operative association with the keyboard.

2. The apparatus, according to claim 1, wherein the display screen is configured to be substantially coextensive with the top surface of the part having the display screen to maximize the potential area on which data and images can be displayed.

3. The apparatus, according to claim 1, wherein the display screen is touch sensitive.

4. The apparatus, according to claim 1, further comprising a controller configured to coordinate the operation of the display with the operation of the keyboard such that the data and images displayed are oriented in a parallel orientation relative to the keyboard when the keyboard is in use.

5. The apparatus according to claim 1, wherein when the part having the display screen is fully inserted into the enclosure at least a portion of the display is visible for displaying data input by the user.

6. The apparatus, according to claim 1, wherein, the part having the display screen is connected to the enclosure by a coupling that allows said part having the display screen to be pivoted, wherein the entire display is visible and configured to be oriented at an ergonomic angle.

7. The apparatus, according to claim 1, wherein the keyboard comprises a full function QWERTY array of keys.

8. The apparatus, according to claim 1, further comprising a window in the deck portion through which at least a portion of the display screen is visible when said part having the display screen is in the enclosure and the lid is in at least a partially closed position.

9. The apparatus, according to claim 1, wherein the part having the display screen is functionally independent of said enclosure.

10. The apparatus according to claim 1 wherein the part having the display screen is a mobile communication device or a personal data assistant.

11. The apparatus of claim 1 wherein said lid is configured to be pivotable between a fully open position and a fully closed position, wherein the lid is configured to lie substantially parallel to the deck in the fully open position and substantially parallel to the opening in the fully closed position.

12. The apparatus of claim 1, wherein when the part having the display is fully inserted into the enclosure, part of the display screen is not visible due to being covered by the deck.

13. The apparatus of claim 1, wherein in the open position the surface of the lid underneath and opposite the keyboard mounted on the lid rests on the supporting planar surface of the deck and in the closed position the surface of the lid underneath and opposite the keyboard mounted on the lid does not rest on the supporting planar surface of the deck.

14. A method comprising:
   detecting an insertion of a part having a display screen into an enclosure of a device, and operatively connecting the part having the display screen to the enclosure;
   detecting whether the part having the display screen is fully inserted or pivotably inserted into the enclosure and adjusting a display area of the display screen in correspondence to whether the part having the display screen is fully inserted or pivotably inserted, wherein the display area of the display screen has a first value when the part having the display screen is fully inserted and has a second value when the part having the display screen is pivotably inserted, wherein the first value is smaller than the second value; and
   activating a keyboard of the enclosure upon detection of the insertion of the part having the display screen, the activated keyboard being operable with the part having the display screen, to allow a keyboard input to control the display of data and images on the display screen.

15. The method of claim 14, further comprising detecting an orientation of the display screen relative to an orientation of the keyboard and orienting the display area of the part having the display screen to be in a parallel relation to the keyboard, 16. The method according to claim 14 further comprising that the keyboard is pivotable between a fully open position and a closed position and detecting that the part having the display screen is inserted prior to activating the keyboard.

17. The method according to claim 16, further comprising limiting a size of the display area of the display screen to an area of a window in the enclosure through which at least a portion of the display screen of the part having the display screen is visible when said part is fully inserted in the enclosure and the keyboard is in the closed position.

18. A system comprising:
   a part comprising a display; and
   a cover part comprising:
      an enclosure with an opening configured to receive the part having the display screen and enclose the part having the display screen within the enclosure;
      a deck constructed adjacent to the opening;
      a lid pivotally connected to the deck, wherein the lid is configured to move between:
         an open position in which a surface of the lid underneath and opposite a keyboard is supported by and in direct contact with a supporting planar surface of the deck and the lid does not close the opening, and
         a closed position in which the lid closes the opening and the surface of the lid underneath and opposite the keyboard mounted on the lid is not supported by and not in direct contact with the supporting planar surface of the deck;
      the keyboard mounted on the lid and accessible for use in the open position; and
      a connector within the enclosure configured to connect the keyboard to the part having the display screen when the part is positioned in the cover part, wherein the keyboard is in operative association with the display of the part having the display screen, to allow a keyboard input to control the display of data and images on the display,
      wherein the supporting surface of the deck faces a direction of the display screen, when the part having the display screen is positioned in the enclosure and in operative association with the keyboard.

19. A system according to claim 18, wherein the keyboard comprises a full function QWERTY array of keys.

20. A system according to claim 18, wherein said deck portion is constructed with a window, through which at least a portion of the display is visible, and said display is controlled to provide data and images according to a function available when said part having the display screen is in the cover part and the lid is in the closed position.

21. The system according to claim 18 wherein the apparatus is a mobile communication device or a personal data assistant.

22. An apparatus comprising:
   a part having a display screen configured for insertion into an enclosure of a cover part; and
   a controller configured to:
      detect an insertion of the part having the display screen into the enclosure formed in the cover part, and operatively connect the part having the display screen to the cover part;
      detect whether the part having the display screen is fully inserted or pivotably inserted into the cover part and adjust a display area of the display screen in correspondence to whether the part having the display screen is fully inserted or pivotably inserted, wherein the display area of the display screen has a first value when the part having the display screen is fully inserted and has a second value when the part having the display screen is pivotably inserted, wherein the first value is smaller than the second value; and
      activate a keyboard of the cover part upon detection of the insertion of the part having the display screen, the activated keyboard being operable with the part having the display screen, to allow a keyboard input to control the display of data and images on the display screen.

23. The apparatus of claim 22 wherein the controller is further configured to orient the display area of the part having the display screen to be in a parallel relation to the keyboard.

24. The apparatus of claim 22, wherein the controller is further configured to limit a size of the display area of the display screen to an area of a window in the cover part through which at least a portion of the display area is visible when said part having the display screen is fully inserted in the cover part and the keyboard is in the closed position.

* * * * *